(12) United States Patent
Huang

(10) Patent No.: US 9,322,975 B2
(45) Date of Patent: Apr. 26, 2016

(54) SIDE-LIGHTING BACKLIGHT AND LIQUID CRYSTAL DISPLAY COMPRISING THE SAME

(71) Applicant: SHENZHEN CHINA STAR OPTOELECTRONICS TECHNOLOGY CO., LTD., Shenzhen, Guangdong (CN)

(72) Inventor: Xiaoyu Huang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/241,409

(22) PCT Filed: Jan. 24, 2014

(86) PCT No.: PCT/CN2014/071382
§ 371 (c)(1),
(2) Date: Feb. 26, 2014

(87) PCT Pub. No.: WO2015/000300
PCT Pub. Date: Jan. 8, 2015

(65) Prior Publication Data
US 2015/0009708 A1  Jan. 8, 2015

(30) Foreign Application Priority Data
Jul. 5, 2013  (CN) .......................... 2013 1 0282545

(51) Int. Cl.
*F21V 7/06* (2006.01)
*F21V 8/00* (2006.01)
*G02F 1/1335* (2006.01)

(52) U.S. Cl.
CPC .......... *G02B 6/003* (2013.01); *G02F 1/133615* (2013.01); *G02B 6/005* (2013.01); *G02B 6/0036* (2013.01)

(58) Field of Classification Search
CPC  G02B 6/003; G02B 6/0013; G02F 1/133615; G02F 1/133553
USPC ....................................................... 349/62, 65
See application file for complete search history.

(56) References Cited

U.S. PATENT DOCUMENTS

2008/0231772 A1* 9/2008 Hung ........................ F21V 5/04
349/65
2012/0275023 A1* 11/2012 Weber .................... G02B 5/305
359/485.03

FOREIGN PATENT DOCUMENTS

| CN | 101939675 A | 1/2011 |
|---|---|---|
| CN | 102287715 A | 12/2011 |
| CN | 102506357 A | 6/2012 |
| CN | 103336387 A | 10/2013 |

OTHER PUBLICATIONS

International Search Report dated May 9, 2014, issued to International Application No. PCT/CN2014/071382.

* cited by examiner

*Primary Examiner* — Karabi Guharay
(74) *Attorney, Agent, or Firm* — Stein IP, LLC

(57) ABSTRACT

The present disclosure relates to the technical field of flat panel display, and proposes a side-lighting backlight, including a back plate on which a reflecting plate is arranged, an optical sheet assembly spaced from the back plate to form an optical cavity therebetween, and a light-emitting element arranged on one side of the back plate, wherein a convex lens is arranged between the reflecting plate and the optical sheet assembly, so that light from the light-emitting element is guided into the optical cavity through the convex lens and then exits through the optical sheet assembly, and the distance between the convex lens and the light-emitting element is greater than a light coupling distance. The convex lens can also function to keep the distance between the optical sheet assembly and the reflecting plate constant. The side-lighting backlight according to the invention has a lighter weight, a thinner thickness and a greatly simplified manufacturing process over a backlight in the prior art.

10 Claims, 2 Drawing Sheets

SIDE-LIGHTING BACKLIGHT AND LIQUID CRYSTAL DISPLAY COMPRISING THE SAME

FIELD OF THE INVENTION

The present disclosure relates to a backlight used in the technical field of flat panel display, and particularly, relates to a side-lighting backlight.

The present disclosure further relates to a liquid crystal display comprising the above-mentioned backlight.

BACKGROUND OF THE INVENTION

Thin film transistor liquid crystal display (TFT-LCD) is one of the main products in the current flat panel display technology, and has become an important display platform in modern IT and video products.

A liquid crystal does not emit light per se, and instead it relies on a backlight for display. The present backlight from mainstream structure is a side-lighting backlight, which means that light is conducted into the range of a display area through a Light Guide Plate (LGP), and then passed through optical diaphragms, such as a prism sheet, a diffusion sheet or the like. In this way, a uniform light source is finally achieved.

FIG. 1 shows a common backlight 100 in the prior art.

The backlight 100 is provided with light-emitting diodes 106 for emitting light, and the light from the light-emitting diodes 106 enters a light guide plate 101. In the light guide plate 101, the light propagating downwards is reflected upwards by a reflecting plate 105 arranged on the lower side of the light guide plate 101. The light then passes from the light guide plate 101 to a diffusion sheet 102, and homogenized and atomized there before uniformly propagating to prism sheets 103 and 104, where it functions as an appropriate light source for liquid crystal display.

However, in the backlight of the prior art, the light guide plate exists as a considerable proportion relative to the whole liquid crystal panel in terms of weight and size. Furthermore, the manufacturing cost of the backlight is correspondingly increased due to certain requirements of the light guide plate for a material. If the light guide plate structure in the prior art can be substituted by a structure or a component which is light in weight, small in size, low in cost and easy to manufacture, a great progress would be achieved in manufacturing of the backlight.

SUMMARY OF THE INVENTION

The backlight in the prior art has many disadvantages. For example, the backlight includes a light guide plate, which exists as a considerable proportion in terms of weight and size relative to the whole backlight, and thus the backlight with a light guide plate cannot be significantly improved on weight and thickness.

In order to eliminate such defects, the present disclosure proposes a side-lighting backlight. In embodiment 1, the side-lighting backlight includes a back plate on which a reflecting plate is arranged, an optical sheet assembly spaced from the back plate to form an optical cavity therebetween, and a light-emitting element arranged on one side of the back plate, wherein a convex lens is arranged between the reflecting plate and the optical sheet assembly, so that light from the light-emitting element is guided into the optical cavity through the convex lens and then exits through the optical sheet assembly, and the distance between the convex lens and the light-emitting element is greater than a light coupling distance. The convex lens can also function to keep the distance between the optical sheet assembly and the reflecting plate constant.

In embodiment 2 improved according to embodiment 1, the backlight further includes a reflecting surface between the reflecting plate and the optical sheet assembly, and the reflecting surface is concave in the direction facing the light-emitting element and is configured to reflect light to the reflecting plate or the optical sheet assembly.

In embodiment 3 improved according to embodiment 1 or 2, the convex lens between the reflecting plate and the optical sheet assembly is located at the end close to the light-emitting element, and the reflecting surface between the reflecting plate and the optical sheet assembly is located at the end away from the light-emitting element. Thus, the reflecting surface can keep the distance between the optical sheet assembly and the reflecting plate at the end far from the light source constant.

In embodiment 4 improved according to any of embodiments 1 to 3, reflecting particles are arranged on the reflecting plate.

In embodiment 5 improved according to embodiment 1, the backlight further includes a gasket between the reflecting plate and the optical sheet assembly at the end away from the light-emitting element, which is configured to keep the distance between the reflecting plate and the optical sheet assembly. In embodiment 6 improved according to embodiment 5, reflecting particles are arranged on the reflecting plate, and the reflecting particles are arranged relatively densely or having relatively high reflectivity at a position of the reflecting plate away from the light-emitting element.

In embodiment 7 improved according to any of embodiments 1 to 6, the convex lens extends longitudinally along the edges of the reflecting plate and the optical sheet assembly, and the cross section of the convex lens is a semicircle the surface of which facing the optical cavity is an arc. In embodiment 8 improved according to any of embodiments 1 to 7, the convex lens is fixed on the surface of each of the reflecting plate and the optical sheet assembly facing the optical cavity with adhesive respectively.

In embodiment 9 improved according to any of embodiments 1 to 8, the light-emitting element is a light-emitting diode.

The present disclosure also proposes a liquid crystal display comprising the above-mentioned backlight.

According to the present disclosure, the light guide plate structure as used in the traditional side-lighting backlight can be omitted and a homogenized light source can be achieved by cooperative use of the convex lens, the reflecting particles on the reflecting plate, and the optical sheet assembly, such as a prism sheet and a diffusion sheet, or the like.

According to the backlight of the present disclosure, the reflecting particles for reflection, arranged on the reflecting plate, are simple in structure and convenient to implement. The brightness of light at different positions can be adjusted based on the density of the reflecting particles coated and thus the reflectivity of the reflecting plate.

Meanwhile, the backlight of the present disclosure is provided with the convex lens for changing the propagating direction of the incident light, and the convex lens can refract the incident light to a position of the reflecting plate away from the light-emitting element. In this case, it is unnecessary for the reflecting particles on the reflecting plate to be arranged relatively densely at the position away from the light-emitting element, while uniform emergent light can still be realized. Therefore, the manufacturing process is simplified.

The above-mentioned technical features may be combined in various technically feasible manners to generate new technical solutions, as long as the objective of the present disclosure can be fulfilled.

BRIEF DESCRIPTION OF THE DRAWINGS

The present disclosure will be described in more detail below based on merely nonfinite examples with reference to the accompanying drawings. Wherein.

Figure 1:
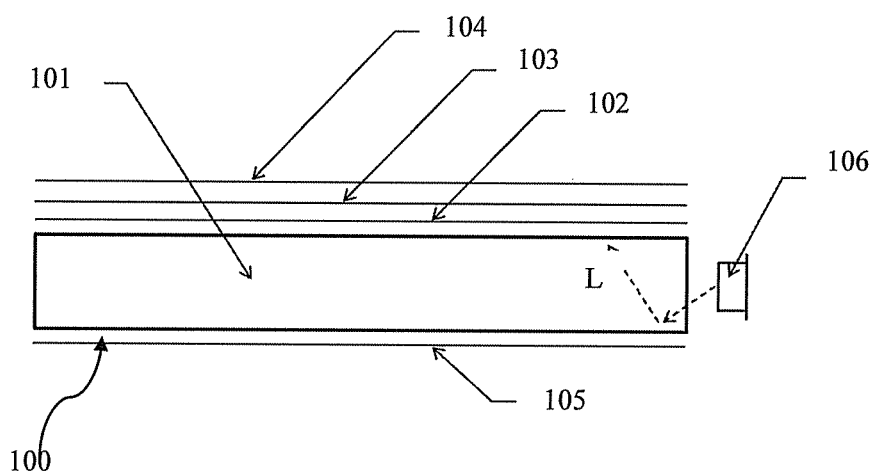
FIG. 1 shows a common side-lighting backlight in the prior art.

In the drawings, the same components are indicated by the same reference signs. The accompanying drawings are not drawn in an actual scale.

DETAILED DESCRIPTION OF THE EMBODIMENTS

The present disclosure will be introduced in detail below with reference to the accompanying drawings.

Figure 2:
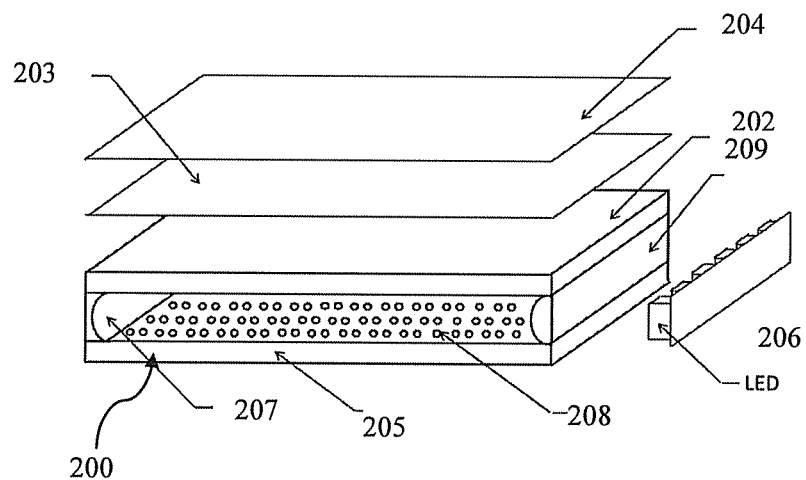
FIG. 2 shows a structural schematic diagram of a side-lighting backlight according to the present disclosure.
Figure 3:
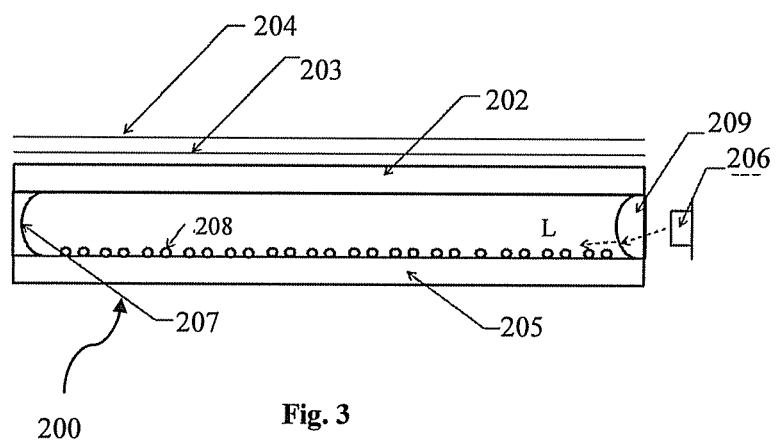
FIG. 3 schematically shows a front view of the side-lighting backlight according to the present disclosure.
Figure 4:
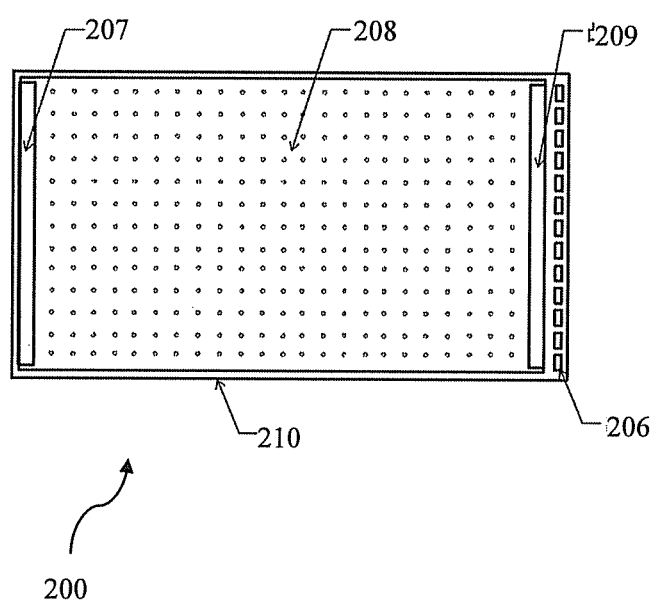
FIG. 4 schematically shows a top view of the side-lighting backlight according to the present disclosure.

FIGS. 2 to 4 show a side-lighting backlight 200 according to the present disclosure.

The backlight 200 includes a back plate 210 (merely shown in FIG. 4). A reflecting plate 205 is arranged on the back plate 210, and configured to reflect light. In the accompanying drawings, the reflecting plate 205 is located on the lower portion of the backlight 200. Reflecting particles 208 are provided on the reflecting plate 205, which reflects the light with the aid of the reflecting particles 208.

The reflecting particles 208 in the present disclosure are micro optical reflecting substances, which can affect the refraction angle of the light by selecting different materials, so as to meet certain design requirements. While the light can be reflected with the reflecting plate 205 per se, the reflecting particles 208 are used for secondary adjustment of the light path, so that the light path can meet the design requirements.

The side-lighting backlight 200 further includes light-emitting diodes 206 disposed on one side of the back plate 210, in order to emit light. In the drawings, the light-emitting diodes 206 are located on the right side of each accompanying drawing.

The side-lighting backlight 200 further includes an optical sheet assembly, which may include a diffusion sheet 202, and prism sheets 203 and 204 arranged on the diffusion sheet 202. The diffusion sheet 202 and the prism sheets 203 and 204 are arranged in parallel to the reflecting plate 205 at certain distances. Therefore, an optical cavity is formed between the optical sheet assembly and the reflecting plate 205. In an example shown in the accompanying drawings, compared with the prism sheets 203 and 204, the diffusion sheet 202 is located at a position relatively close to the reflecting plate 205, and two layers of prism sheets 203 and 204 are disposed. However, it is not intended to limit the present disclosure, and in other examples, multiple layers of prism sheets may be disposed, or the prism sheets can be disposed in different positions, as long as the objective of the present disclosure can be fulfilled.

The side-lighting backlight 200 further includes a convex lens 209, which is arranged between the reflecting plate 205 and the diffusion sheet 202.

The convex lens 209 enables the light from the light-emitting diodes 206 to be converged, so that the light can be conducted to the distal end, i.e. the end far from the light-emitting diodes 206, more effectively. Meanwhile, the convex lens 209 is configured to keep the distance between the reflecting plate 205 and the diffusion sheet 202 constant. Light beams converged by the convex lens 209 are reflected by the reflecting plate 205 once reaching there, and then enter the diffusion sheet 202 and the prism sheets 203 and 204 for homogenization.

With reference to the accompanying drawings, the convex lens 209 extends longitudinally along the edges of the reflecting plate 205 and the diffusion sheet 202. The cross section of the convex lens 209 is a semicircle. The surface of the semicircle facing the optical cavity is an arc, while the other surface of the semicircle facing the light-emitting diodes is a plane. The convex lens 209 is fixed on the upper surface of the reflecting plate 205 and the lower surface of the diffusion sheet 202 with adhesive respectively, in order to keep the distance between the reflecting plate 205 and the diffusion sheet 202 constant.

The convex lens 209 is spaced from the light-emitting diodes 206 for at least a light coupling distance or above. This is for the reason that a distance is required for coupling before the light emitted by the light-emitting diodes 206 enters the convex lens 209, so that the light between adjacent light-emitting diodes can be uniformly mixed to avoid converged light. The light coupling distance is the minimum distance for preventing the converged light between the light-emitting diodes 206 and the convex lens 209. Therefore, based on this, even if the size for manufacturing and the economic cost are taken into consideration, and the distance between the light-emitting diodes 206 and the convex lens 209 is minimized, the distance between the light-emitting diodes 206 and the convex lens 209 should be at least equal to the light coupling distance. Taking a 28-inch product as an example, the light coupling distance should be 0.8 mm.

In an example, the convex lens functions to converge light along the vertical direction only. This is because, on the one hand, the convergence along the horizontal direction is difficult to realize with a simple structure, and on the other hand, the light coupling distance would be greatly increased and thus no beneficial effects can be achieved.

With reference to the accompanying drawings, the side-lighting backlight 200 further includes a reflecting surface 207 between the optical sheet assembly and the reflecting plate 205. The reflecting surface 207 is concave in the direction facing the light-emitting diodes 206, and is configured to reflect light to the reflecting plate 205 or the diffusion sheet 202 and keep the distance between the reflecting plate 205 and the diffusion sheet 202 constant at the same time.

In an example shown in the accompanying drawings, the convex lens 209 between the optical sheet assembly and the reflecting plate 205 is located at the end close to the light-emitting diodes 206, and the reflecting surface 207 between the optical sheet assembly and the reflecting plate 205 is located at the end away from the light-emitting diodes 206.

In an alternative example, the side-lighting backlight 200 can be provided with no reflecting surface 207, but with a gasket arranged between the optical sheet assembly and the reflecting plate 205 at the end away from the light-emitting diodes 206, which is configured to keep the distance between the reflecting plate 205 and the optical sheet assembly constant at the position away from the light-emitting diodes 206. Meanwhile, the density of the reflecting particles 208 coated on the reflecting plate 205 is increased at the position away from the light-emitting diodes 206, or the reflectivity of the reflecting particles 208 is improved at the portion away from the light-emitting diodes 206. By means of which, it can be ensured that the brightness stays consistent from the side away from the light-emitting diodes 206 to the side close to the light-emitting diodes 206.

In an example shown in the accompanying drawings, due to the reflecting surface 207, the brightness distribution has been adjusted through the convex lens 209 and the reflecting surface 207. Therefore, the reflecting particles 208 can be simply coated on the reflecting plate 205 in a uniform manner for increasing the reflecting efficiency. Thus the complexity of the manufacturing process can be reduced. Meanwhile, screen printing may be performed on the diffusion sheet 202, which enables the light to be homogenized more easily.

The light emitted by the light-emitting diodes 206 would have been aggregated nearby the light-emitting diodes 206. However, the side-lighting backlight 200 according to the present disclosure provides the convex lens 209 with a convergence function, which enables the light emitted by the light-emitting diodes 206 to be refracted through the convex lens 209. The light then reaches the side of the reflecting plate 205 away from the light-emitting diodes 206. In this way, the problem is solved that the brightness at the side close to the light-emitting diodes is overly high and the brightness at the side away from the light-emitting diodes is overly low.

Meanwhile, the side-lighting backlight 200 according to the present disclosure may fulfill the objective through at least one convex lens, which makes the weight and cost of a light source effectively controlled.

Moreover, the present disclosure further proposes a liquid crystal display including the backlight 200, which can provide a uniform and applicable light source for the liquid crystal display.

Although the present disclosure has been described with reference to the preferred examples, various modifications could be made to the present disclosure without departing from the scope of the present disclosure and components in the present disclosure could be substituted by equivalents. The present disclosure is not limited to the specific examples disclosed in the description, but includes all technical solutions falling into the scope of the claims.

The invention claimed is:

1. A side-lighting backlight, including:
a back plate on which a reflecting plate is arranged;
an optical sheet assembly spaced from the back plate to form an optical cavity therebetween;
a light-emitting element arranged on one side of the back plate,
a convex lens between the reflecting plate and the optical sheet assembly, so that light from the light-emitting element is guided into the optical cavity through the convex lens and then exits through the optical sheet assembly, the distance between the convex lens and the light-emitting element being greater than a light coupling distance; and
a reflecting surface between the reflecting plate and the optical sheet assembly, and the reflecting surface is concave in the direction facing the light-emitting element and is configured to reflect light to the reflecting plate or the optical sheet assembly.

2. The side-lighting backlight according to claim 1, wherein the convex lens between the reflecting plate and the optical sheet assembly is located at an end close to the light-emitting element, and the reflecting surface between the reflecting plate and the optical sheet assembly is located at an end away from the light-emitting element.

3. The side-lighting backlight according to claim 1, wherein reflecting particles are provided on the reflecting plate.

4. The side-lighting backlight according to claim 1, wherein the convex lens extends longitudinally along the edges of the reflecting plate and the optical sheet assembly, and the cross section of the convex lens is a semicircle, the surface of which facing the optical cavity is an arc.

5. The side-lighting backlight according to claim 2, wherein the convex lens extends longitudinally along the edges of the reflecting plate and the optical sheet assembly, and the cross section of the convex lens is a semicircle, the surface of which facing the optical cavity is an arc.

6. The side-lighting backlight according to claim 1, wherein the convex lens is fixed on the surfaces of each of the reflecting plate and the optical sheet assembly facing the optical cavity respectively by means of adhesive.

7. The side-lighting backlight according to claim 2, wherein the convex lens is fixed on the surfaces of each of the reflecting plate and the optical sheet assembly facing the optical cavity respectively by means of adhesive.

8. The side-lighting backlight according to claim 1, wherein the light-emitting element is a light-emitting diode.

9. The side-lighting backlight according to claim 2, wherein the light-emitting element is a light-emitting diode.

10. A liquid crystal display comprising a backlight, which includes:
a back plate on which a reflecting plate is arranged;
an optical sheet assembly spaced from the back plate to form an optical cavity therebetween;
a light-emitting element arranged on one side of the back plate;
a convex lens between the reflecting plate and the optical sheet assembly, so that light from the light-emitting element is guided into the optical cavity through the convex lens and then exits through the optical sheet assembly, the distance between the convex lens and the light-emitting element being greater than a light coupling distance; and
a reflecting surface between the reflecting plate and the optical sheet assembly, and the reflecting surface is concave in the direction facing the light-emitting element and is configured to reflect light to the reflecting plate or the optical sheet assembly.

* * * * *